Figures 1, 2:
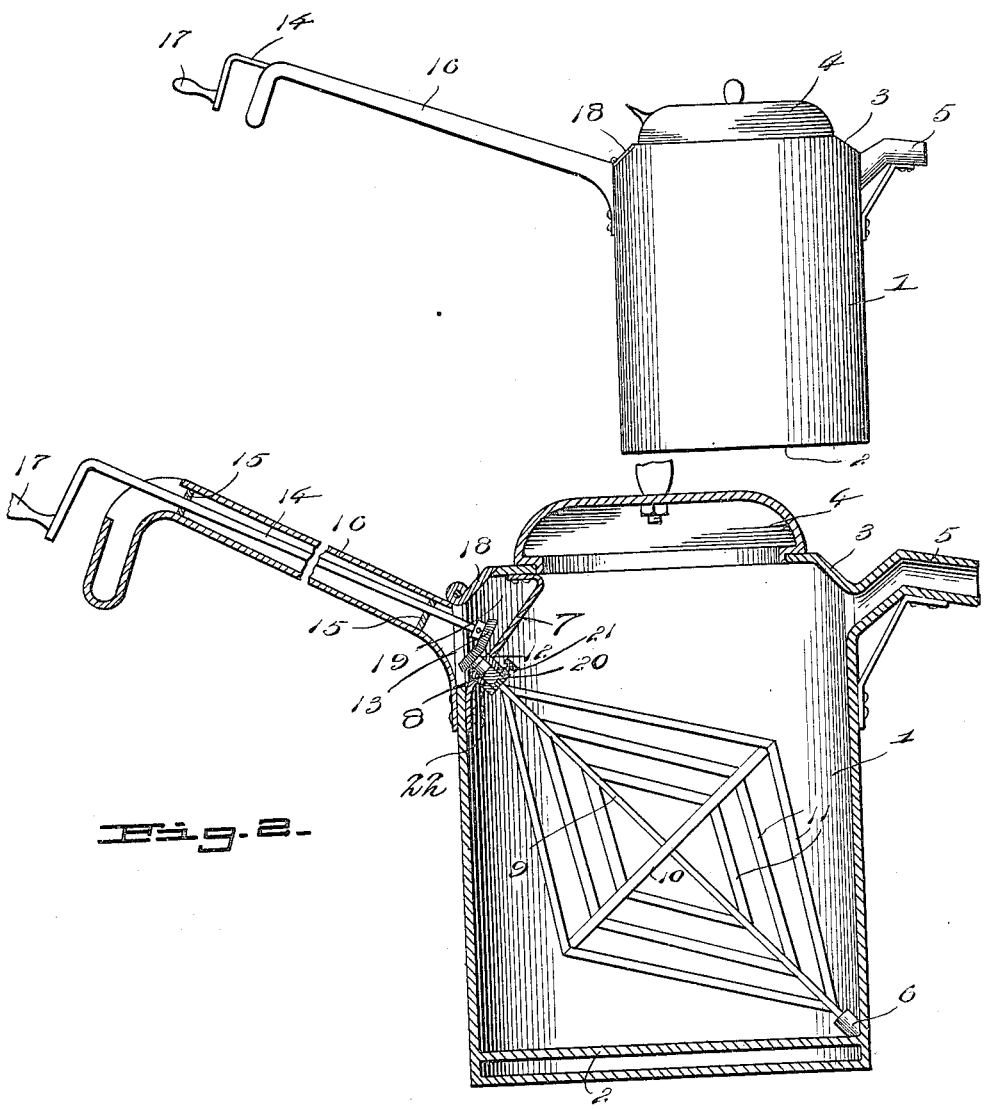

V. T. TAYLOR.
COOKING RECEPTACLE.
APPLICATION FILED JULY 2, 1912.

1,141,020.

Patented May 25, 1915.

Inventor
Virgil T. Taylor

Witnesses
C. E. Kemper.
A. L. Evans

By Victor J. Evans
Attorney

United States Patent Office.

VIRGIL THOMAS TAYLOR, OF HARRODS CREEK, KENTUCKY.

COOKING-RECEPTACLE.

1,141,020.

Specification of Letters Patent.

Patented May 25, 1915.

Application filed July 2, 1912. Serial No. 707,295.

*To all whom it may concern:*

Be it known that I, VIRGIL T. TAYLOR, a citizen of the United States, residing at Harrods Creek, in the county of Jefferson and State of Kentucky, have invented new and useful Improvements in Cooking-Receptacles, of which the following is a specification.

My invention consists of improvements in cooking receptacles and particularly that type which are specifically adapted for cooking materials which need constant stirring, such as apple butter, etc.

The object of the invention is to provide a device wherein the stirring may be done without removing the lid of the vessel and without the use of hand operated ladles or paddles.

Further objects of the invention will appear in the following specific description in connection with the accompanying drawing, which forms part of this application, and in which:—

Figure 1 is a side elevation. Fig. 2 is a vertical sectional view.

Referring more particularly to the drawing, 1 represents a receptacle which may be either cylindrical or of other formation and is preferably provided with a double bottom 2. The top of the vessel or receptacle is inwardly flanged, as shown at 3, and is closed by a top 4 which preferably has an air tight fit, the steam or vapor of the vessel being permitted to escape through a suitable spout 5. Arranged in the bottom of the vessel and at one side thereof is a bearing 6 and diagonally opposite the same adjacent the top of the vessel, a partition 7 is provided in which is journaled a bearing 8. Removably mounted in these bearings is a diagonal shaft 9 having a transverse brace piece 10 secured thereto, to which and to the shaft are secured diamond shaped beater fans 11 which constitute a ladle or stirring device adapted to agitate the material when operated, as will be hereinafter described. The bearing 8 preferably has a squared socket to receive the squared end of the shaft 9 so that when the bearing is turned, the shaft will also be rotated. The opposite end of the bearing is provided with a gear 12 which meshes with a similar gear 13 formed on the end of the operating shaft 14 which is journaled in bridge pieces 15 secured within the manipulating handle 16. This manipulating handle is secured to the receptacle in any suitable manner. The outer end of the shaft 14 is provided with an operating crank 17 by which the agitator will be operated. In order to gain access to the gears, an auxiliary top 18 is provided which permits entrance into the compartment 19 in which the gears are located, this compartment being formed by the receptacle and the partition 7.

To provide means for readily removing the shaft 9 from the bearings 6, and 8, a collar 20 is secured to the end of the bearing 8 by means of a set screw 21, when the collar is loosened the bearing 8 may be shifted in the sleeve 22 carried by the partition 7 and the squared end of the shaft 9 and removed from said bearing.

What is claimed is:—

A device of the class described comprising a receptacle, a handle therefor, a bearing located within the receptacle at the point of juncture of the bottom with the body portion thereof, a closure for the receptacle, a flanged partition arranged within the receptacle diagonally opposite said bearing and defining a compartment by the space therebetween and said body portion, a bearing fitted in said partition in a line with the first mentioned bearing, a dasher shaft mounted in the receptacle and having its opposite ends fitted in the bearings, an operating shaft arranged in said handle, gearing between said operating shaft and said second mentioned bearing and an auxiliary cover hinged to the top of the receptacle and engaging the flange of said partition to permit access to be had to the compartment.

In testimony whereof I affix my signature in presence of two witnesses.

VIRGIL THOMAS TAYLOR.

Witnesses:
 BENSON O. HEERR,
 FRED DIEFENBACH.

Copies of this patent may be obtained for five cents each, by addressing the "Commissioner of Patents, Washington, D. C."